United States Patent Office 2,970,850
Patented Feb. 7, 1961

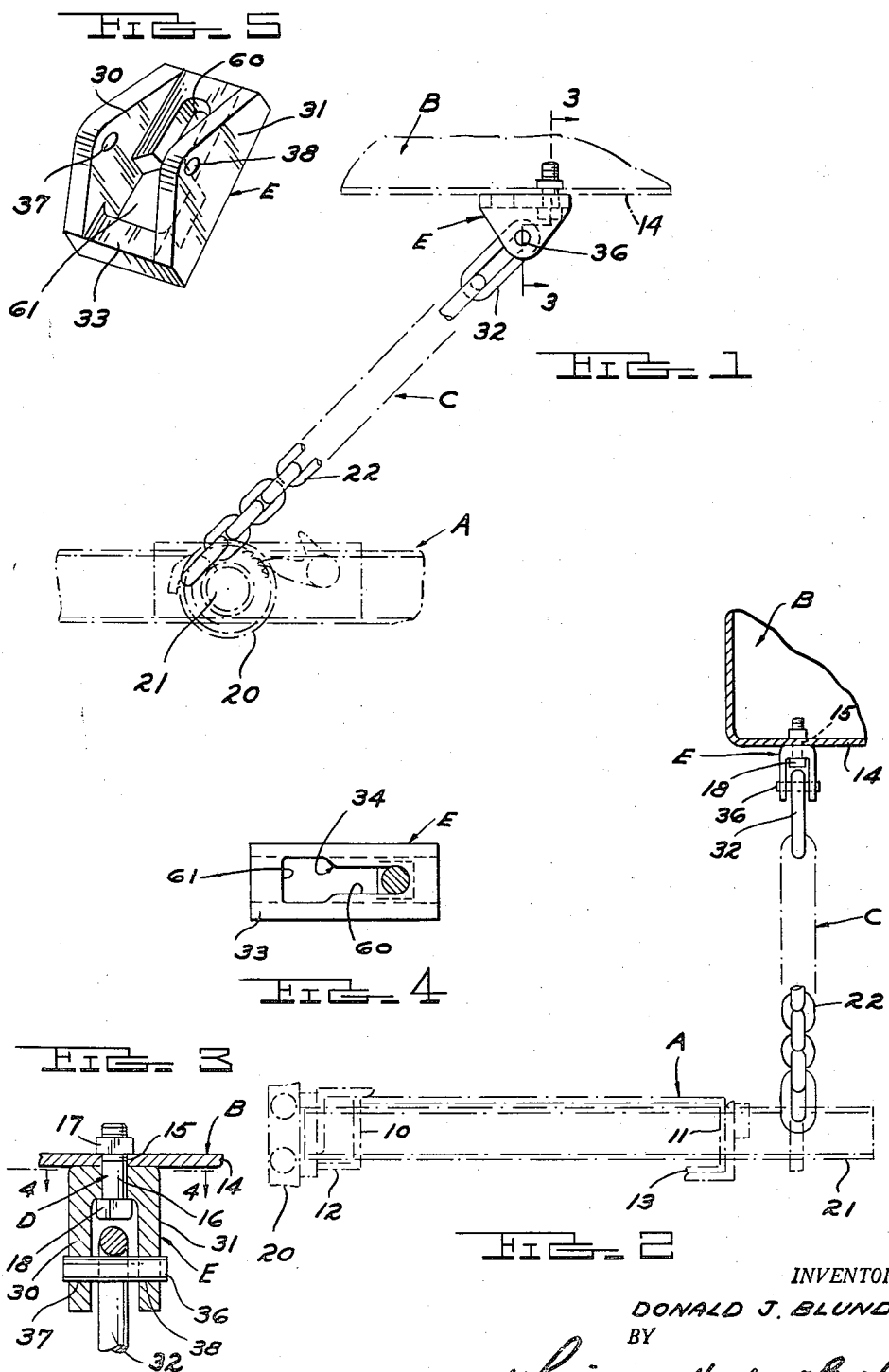

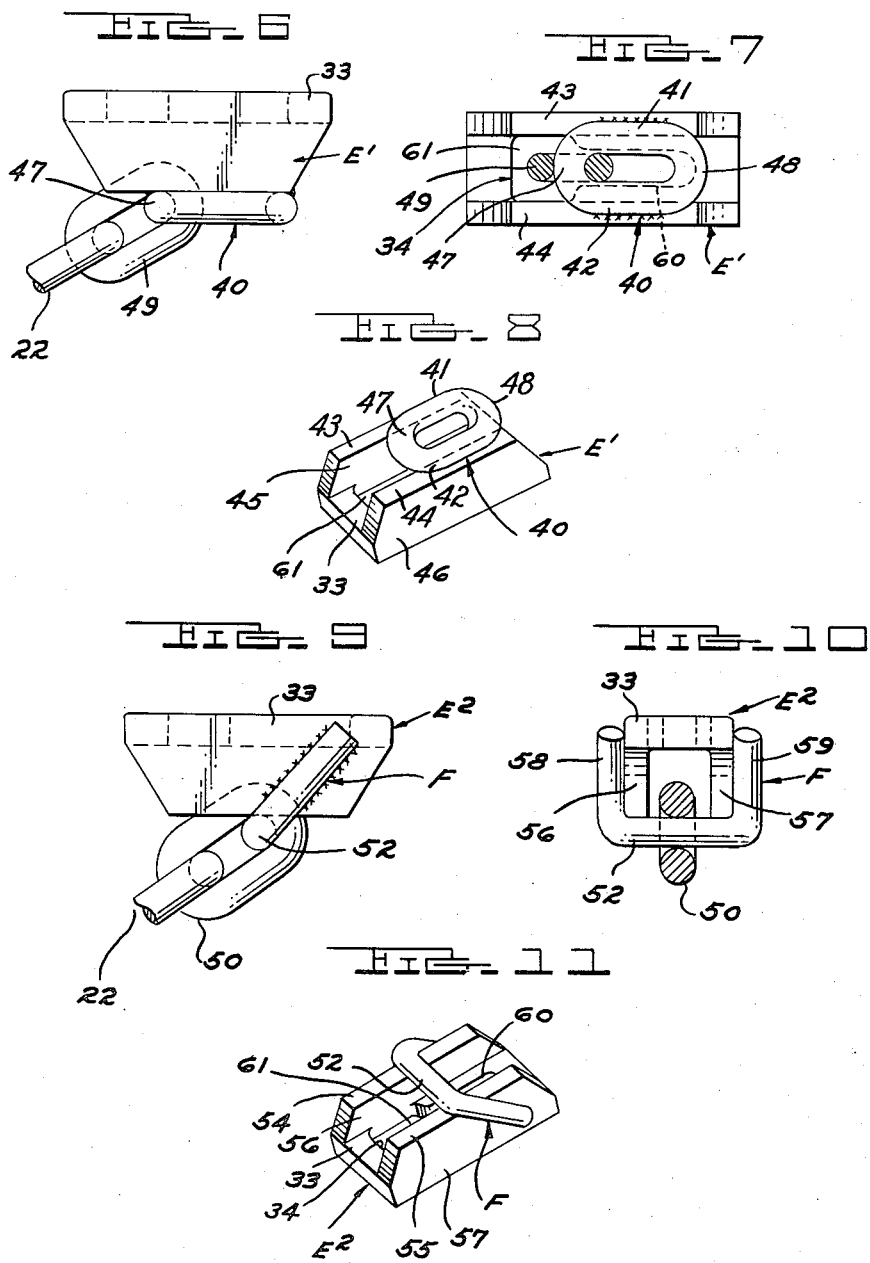

2,970,850

VEHICLE TIE-DOWN DEVICE

Donald J. Blunden, Detroit, Mich., assignor to Whitehead & Kales Company, River Rouge, Mich., a corporation of Michigan Filed Sept. 21, 1959, Ser. No. 841,354

5 Claims. (Cl. 280—179)

This invention relates generally to hook structures, and refers more particularly to those adapted for use as portions of tie-down devices employed upon transport vehicles, such as carry-car trailers and the like, for holding or anchoring motor vehicles carried thereby.

One of the essential objects of the invention is to provide a hook structure of the type mentioned that is permanently connected to the free end of a flexible tensioning chain or cable of the tie-down device on the transport vehicle, and that is adapted to be detachably connected to a headed projection on the chassis frame of a motor vehicle carried by the transport vehicle.

Another object is to provide a substantially U-shaped hook structure having substantially parallel side wall portions to which a link at the free end of the tensioning chain or cable of the tie-down device is permanently connected, and having an elongated substantially flat base portion provided with a longitudinally extending substantially keyhole-shaped slot adapted to detachably receive the head and shank respectively of the headed projection on the chassis frame of a motor vehicle after the latter has been loaded upon the transport vehicle.

Another object is to provide a hook structure wherein the parallel side wall portions thereof are spaced apart a predetermined distance relative to the cross-sectional area of the head of the headed projection to prevent relative turning movement between the headed projection and hook structure after such parts are connected together.

Another object is to provide a hook structure wherein the upper side of the substantially flat elongated base portion thereof is adapted to have surface-to-surface bracing engagement with the underside of the chassis frame of the motor vehicle, and the head of the headed projection is engageable with the underside of said elongated flat base portion of the hook structure and is adapted to support the latter when it is connected to the headed projection.

Another object is to provide a connection between said hook structure and the tensioning chain or cable of the tie-down device that enables the tensioning chain or cable to extend at approximately 45 degrees or less relative to the underside of the chassis frame of the motor vehicle for proper tie-down action when the parts are connected together.

Another object is to provide a hook structure that enables the headed projection on the chassis frame to be connected to the elongated flat base portion of the hook structure at one end thereof, and enables the pull exerted by the tensioning chain or cable on said hook structure to be at a point below and to the rear of said headed projection, so that the other end of the elongated flat base portion of the hook structure will be forced firmly against and held in engagement with the underside of the chassis frame of the motor vehicle within the angle mentioned when the parts are connected together.

Another object is to provide a hook structure that is simple in construction, economical to manufacture and efficient in operation.

Other objects, advantages and novel details of construction of this invention will be made more apparent as this description proceeds, especially when considered in connection with the accompanying drawings wherein:

Figure 1 is a fragmentary perspective view of a portion of a motor vehicle, a portion of a transport vehicle for supporting said motor vehicle, and a tie-down device carried by the transport vehicle and detachably connected to the motor vehicle.

Figure 2 is a view taken at substantially right angles to Figure 1.

Figure 3 is a vertical sectional view taken substantially on the line 3—3 of Figure 1.

Figure 4 is a horizontal sectional view taken substantially on the line 4—4 of Figure 3.

Figure 5 is a perspective view of the hook structure.

Figure 6 is an elevational view of a slightly modified form of hook structure, and showing a modified connection between the tensioning chain or cable and said hook structure.

Figure 7 is a bottom plan view of the structure illustrated in Figure 6.

Figure 8 is a perspective view of the hook structure and attached link of the tensioning chain or cable illustrated in Figures 6 and 7.

Figure 9 is a view similar to Figure 6 but showing another modification.

Figure 10 is an end view of the structure illustrated in Figure 9, with portions of the end link of the tensioning chain or cable broken away and in section.

Figure 11 is a perspective view of the hook structure illustrated in Figures 9 and 10.

It is customary to provide transport vehicles, such as carry-car trailers, with one or more longitudinally extending tracks for supporting the ground engaging wheels of motor vehicles being carried thereby, and to provide tie-down devices between said supporting tracks or other suitable portions of the transport vehicles and portions of the motor vehicles to hold the latter against displacement. Usually each track has a pair of laterally spaced substantially parallel side rails that constitute runways for the ground engaging wheels of the motor vehicles, and the tie-down devices are connected to the transport vehicle at longitudinally spaced points of the tracks. Ordinarily, four tie-down devices are employed for each motor vehicle on a track. Two of such tie-down devices are upon opposite sides of the motor vehicle adjacent the forward end thereof, and two are upon opposite sides of the motor vehicle adjacent the rear end thereof.

Also, it is customary to utilize the tie-down devices to pull down the chassis frames of the motor vehicles relative to their supporting tracks on the transport vehicle to place the spring suspension means of the motor vehicles under compression to more effectively hold the motor vehicles against displacement and to obtain the desired over-all height. Thus, the tie-down devices usually have flexible tensioning elements, such as chains or cables, that are permanently connected at one end thereof to and are wound upon rotatable transversely extending shafts of suitable winches carried by the tracks or other portions of the transport vehicle, and are detachably connected at their free ends to portions of the motor vehicles being carried by the transport vehicle. Sometimes the chains or cables of the two tie-down devices at the forward end of one motor vehicle are connected to and are wound upon a transversely extending shaft of one winch, while the chains or cables of the two tie-down devices at the rear end of said motor vehicle are connected to and are wound upon a transversely extending shaft of another winch.

Also, it is customary to connect hook structures of various types to the free ends of the tensioning chains or cables of the tie-down devices, and to connect such hook structures to various portions of the motor vehicles carried by the transport vehicles. However, portions of these hook structures are usually inserted through holes or openings in various sheet metal elements of the motor vehicles to connect the tensioning chains or cables of the tie-down devices to the motor vehicles, as illustrated in Huebshman et al. 2,322,576 and Weiss et al. 2,591,986, and such connections are objectionable for various reasons.

The present hook structure embodying my invention has been designed as an improvement upon the hook structures employed in the past, and is adapted to be more positively and securely attached to a headed projection on the chassis frame of a motor vehicle. Moreover, my improved hook structure provides a stronger and more efficient connection between the tensioning chain or cable of the tie-down device and the headed projection on the chassis frame of the motor vehicle to be anchored.

My improved hook structure is adapted to be permanently connected to the free end of each tensioning chain or cable of each tie-down device employed on a transport vehicle to hold or anchor motor vehicles against displacement. Inasmuch as four such tie-down devices are usually employed to hold or anchor each motor vehicle, and the operation of each tie-down device is the same, it will be unnecessary to illustrate and describe more than one such tie-down device equipped with my improved hook structure. Also, my improved hook structure is adapted to be detachably connected to each headed projection provided on the chassis frame of a motor vehicle. Inasmuch as four such headed projections would ordinarily be provided on the side rails of a chassis frame of a motor vehicle, two spaced longitudinally apart on one side rail, and two spaced longitudinally apart on the other side rail, it will be unnecessary to illustrate and describe more than one side rail provided with a headed projection. Likewise, in the present instance, the rotatable shafts of the winches of the tie-down devices are designed to extend transversely of the customary two laterally spaced substantially parallel side rails of the supporting track on the transport vehicle, hence it will be unnecessary to illustrate and describe more than one rotatable shaft extending transversely of one side rail of the track.

In the drawings, A is one side rail of a longitudinally extending track of a transport vehicle, B is one side rail of a chassis frame of a motor vehicle, and C is one of the tie-down devices carried by the transport vehicle.

The side rail A of the longitudinally extending track of the transport vehicle is an inverted channel and is provided at the lower edges of the opposite depending side walls 10 and 11 respectively thereof with laterally projecting reinforcing flanges 12 and 13 respectively.

The side rail B of the chassis frame of the motor vehicle is an inwardly opening channel provided at the proper point in the bottom wall 14 thereof with a vertical opening 15 that receives the shank 16 of a downwardly projecting bolt D. Such shank 16 projects upwardly above the lower side wall 14 and is engaged by a suitable nut 17, and projects downwardly below the lower side wall 14 and is provided at its lower end in spaced relation to the lower side wall 14 with a polygonal head 18.

The tie-down device C comprises a ratchet type winch 20 having a rotatable shaft 21 extending transversely of and supported by the depending side walls 10 and 11 of the side rail A of the track, and a flexible tensioning chain or cable 22 connected at one end to and adapted to be wound upon said rotatable shaft 21 and connected at the other end thereof to a hook structure E embodying my invention.

The hook structure E is permanently connected to the tensioning chain or cable 22 and is adapted to be detachably connected to the bolt D projecting downwardly from the underside of the side rail B of the chassis frame of the motor vehicle to hold or anchor the latter on the track of the transport vehicle.

Preferably the hook structure E has a substantially U-shaped body provided with substantially parallel side wall portions 30 and 31 to which a closed ring or link 32 at the free end of the tensioning chain or cable 22 is connected permanently, and is provided with an elongated substantially flat base portion 33 having therein a longitudinally extending substantially keyhole-shaped slot 34 adapted to receive successively the head 18 and shank 16 respectively of the bolt D to connect the tensioning chain or cable 22 of the tie-down device to the side rail B of the chassis frame of the motor vehicle.

In Figures 1 to 5 inclusive of the drawings, the parallel side walls 30 and 31 respectively of the hook structure straddle the end link 32 of the tensioning chain or cable 22. A pin or crosspiece 36 extends freely through and is pivotally connected to said end link 32, and extends through and is secured in aligned holes 37 and 38 respectively in the side wall portions 30 and 31 of the body to permanently connect the hook structure E to the link 32 of the tensioning chain or cable 22.

In Figures 6 to 8 inclusive, an elongated ring 40 has spaced substantially parallel leg portions 41 and 42 respectively extending lengthwise of and welded to substantially parallel flat edges 43 and 44 respectively of the spaced parallel side wall portions 45 and 46 of the body of the hook structure $E^1$, and has crossarms 47 and 48 respectively spanning the space between said side wall portions 45 and 46 and secured to the leg portions 41 and 42 at opposite ends thereof. Preferably the crossarm 47 of the ring 40 extends freely through and is pivotally connected to the end link or closed ring 49 of the tensioning chain or cable 22.

In Figures 9 to 11 inclusive, the end link or closed ring 50 of the tensioning chain or cable 22 is connected to the crossarm 52 of a substantially U-shaped strap F straddling and rigidly secured at an angle to the body of the hook structure $E^2$. Preferably the crossarm 52 of the strap F extends through and is pivotally connected to the end link or closed ring 50 of the tensioning chain or cable 22, and extends across and is welded to the substantially parallel flat edges 54 and 55 respectively of the side wall portions 56 and 57 of the hook structure $E^2$, while the substantially parallel arms 58 and 59 respectively of the strap F straddle and are welded to the outer surfaces of the side wall portions 56 and 57 of the hook structure $E^2$.

In each instance, the side wall portions of the hook structure are substantially parallel to each other and are spaced apart a predetermined distance relative to the cross-sectional area of the head 18 of the bolt D to prevent relative turning movement between the bolt D and the hook structure after the shank 16 of said bolt has been engaged with the elongated narrow portion 60 of the keyhole-shaped slot 34 in the elongated base portion 33 of such hook structure. Also, in each instance, the substantially flat elongated base portion 33 of the hook structure is adpated to have surface-to-surface bracing engagement with the underside of the side rail B of the chassis frame of the motor vehicle, and the head 18 of the bolt D is engageable with the underside of said elongated flat base portion 33 of the hook structure and is adapted to support the latter when it is connected to the bolt D. In this connection, it will be noted that the thickness of the flat base portion 33 is substantially equal to the distance between the head 18 of the bolt D and the adjacent lower side wall 14 of the side rail B of the chassis frame of the motor vehicle.

Also, in each instance, the connection between said hook structure and the tensioning chain or cable 22 enables the latter to extend at approximately 45 degrees or less relative to the underside of the side rail B of the chassis frame of the motor vehicle for proper tie-down action when the parts are connected together. Also, in each instance, the keyhole-shaped slot 34 in the flat elongated base portion 33 of the hook structure enables the bolt D to be adjacent one end of said elongated base portion, and enables the pull exerted by the tensioning chain or cable 22 on said hook structure to be at a point below and preferably to the rear of the bolt D, as illustrated in Figure 1, so that the free end of the flat elongated base portion 33 of the hook structure will be forced firmly against and held in engagement with the underside of the side rail B of the chassis frame of the motor vehicle within the angle mentioned when the parts are connected together.

In use, the motor vehicle to be transported is first driven onto a pair of side rails A of the longitudinally extending supporting track therefor, on the transport vehicle to the proper position relative to four tie-down devices such as C. Then the hook structures, such as E or E¹ or E², at the free ends of the tensioning chains or cables 22 of the four tie-down devices C on the transport vehicle are separately connected to the adjacent four bolts D on the undersides of a pair of side rails B of the chassis frame of the motor vehicle, by first moving the hook structures E or E¹ or E² vertically relative to the side rails B of the chassis frame so that the heads 18 of the bolts D will be slipped through the polygonal openings 61 of the keyhole-shaped slots 34, and then moving the hook structures substantially horizontally lengthwise of the side rails B so that the shanks 16 of the bolts D will be received in and will be positioned at or in abutting engagement with the closed ends of the elongated narrow portions 60 of the keyhole-shaped slots. The respective ratchet type winches 20 of the tie-down devices may then be operated by suitable means (not shown) to pull down the chassis frame of the motor vehicle relative to the supporting track on the transport vehicle to place the spring suspension means (not shown) of the motor vehicle under compression to more effectively hold the motor vehicle against displacement and to obtain the desired over-all height.

What I claim as my invention is:

1. The combination with two vertically spaced substantially parallel horizontally extending longitudinal rails respectively of a transport vehicle and of a motor vehicle carried thereby, of a tensioning device between said rails including a winch having a rotatable shaft carried by the lowermost of said rails, a bolt having a vertically extending shank secured to the uppermost of said rails in longitudinally offset relation to said shaft and provided adjacent the lower end of said shank with a head spaced below the underside of said uppermost rail, a hook detachably connected to said bolt, said hook having a substantially flat elongated base and a pair of spaced substantially parallel side walls projecting downwardly from said base, said base being substantially parallel to the underside of said uppermost rail and disposed between the latter and the head aforesaid of said bolt, said base being provided adjacent the end thereof nearest to said shaft with an opening having an area greater than the area of the head of said bolt and provided adjacent the end thereof farthest from said shaft in connecting relation with said opening with an elongated slot receiving the shank of said bolt, the width of said elongated slot being less than the cross sectional area of the head of said bolt whereby opposite side portions of said head rest upon and are supported by the material of said base upon opposite sides of said elongated slot, and a chain connected at one end to and wound upon said shaft and having its other end connected to the downwardly projecting side walls of said hook, said winch being operable to place said chain under tension between said shaft and said hook, said base slidably engaging the underside of said uppermost rail, and said winch being operable to place slack in said chain so that said base may be slid lengthwise of said uppermost rail to place said opening in registration with the head of said bolt to thereby permit manual withdrawal of said hook downwardly from said bolt.

2. The structure defined in claim 1, wherein the chain is provided at said other end thereof with a closed ring, the side walls of said hook straddle a portion of said ring, and a connecting element is secured to said side walls and extends freely through said closed ring to permanently connect said ring to said hook.

3. The structure defined in claim 1, wherein the chain is provided at said other end thereof with a closed ring, the side walls of said hook straddle a portion of said ring, and a connecting element has spaced leg portions rigidly secured to the side walls of said hook and has a crossarm rigidly secured to said spaced leg portions and extending freely through said closed ring to permanently connect said ring to said hook.

4. The structure defined in claim 1, wherein the chain is provided at said other end thereof with a closed ring, and a connecting element has spaced leg portions rigidly secured to the side walls of said hook and has a crossarm rigidly secured to said spaced leg portions and extending freely through said closed ring to permanently connect said ring to said hook.

5. The structure defined in claim 1, wherein an element has spaced leg portions connected to the side walls of said hook and has a crossarm connected to said spaced leg portions, and said other end of said chain is connected to said crossarm.

References Cited in the file of this patent
UNITED STATES PATENTS
1,579,764    Hearn ------------------ Apr. 6, 1926